(No Model.)

G. ROBINSON.
HORSE HAY RAKE.

No. 332,440. Patented Dec. 15, 1885.

WITNESSES
Edward Wolff
George Cook

INVENTOR
George Robinson
By his Attorney

UNITED STATES PATENT OFFICE.

GEORGE ROBINSON, OF CHILLICOTHE, MISSOURI.

HORSE HAY-RAKE.

SPECIFICATION forming part of Letters Patent No. 332,440, dated December 15, 1885.

Application filed January 22, 1885. Serial No. 153,581. (No model.)

*To all whom it may concern:*

Be it known that I, GEORGE ROBINSON, a citizen of the United States, and a resident of Chillicothe, in the county of Livingston and State of Missouri, have invented certain new and useful Improvements in Horse Hay-Rakes, of which the following is a specification.

The invention relates to an improvement in horse-rakes; and it consists in the elements hereinafter described, and particularly pointed out in the claims.

Figure 1:
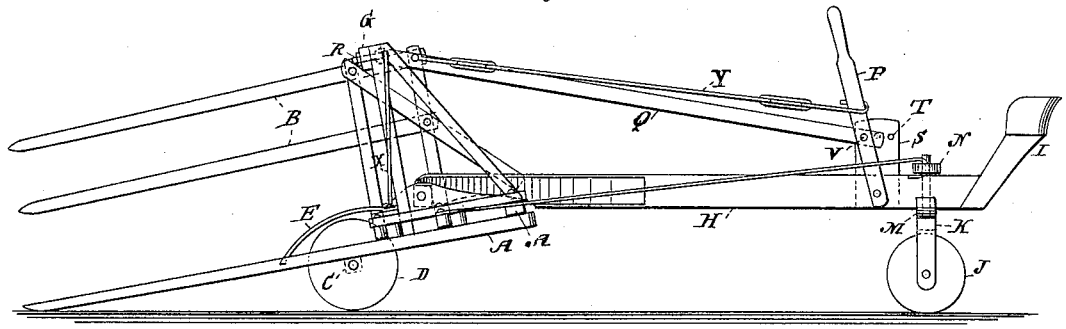
Figure 2:
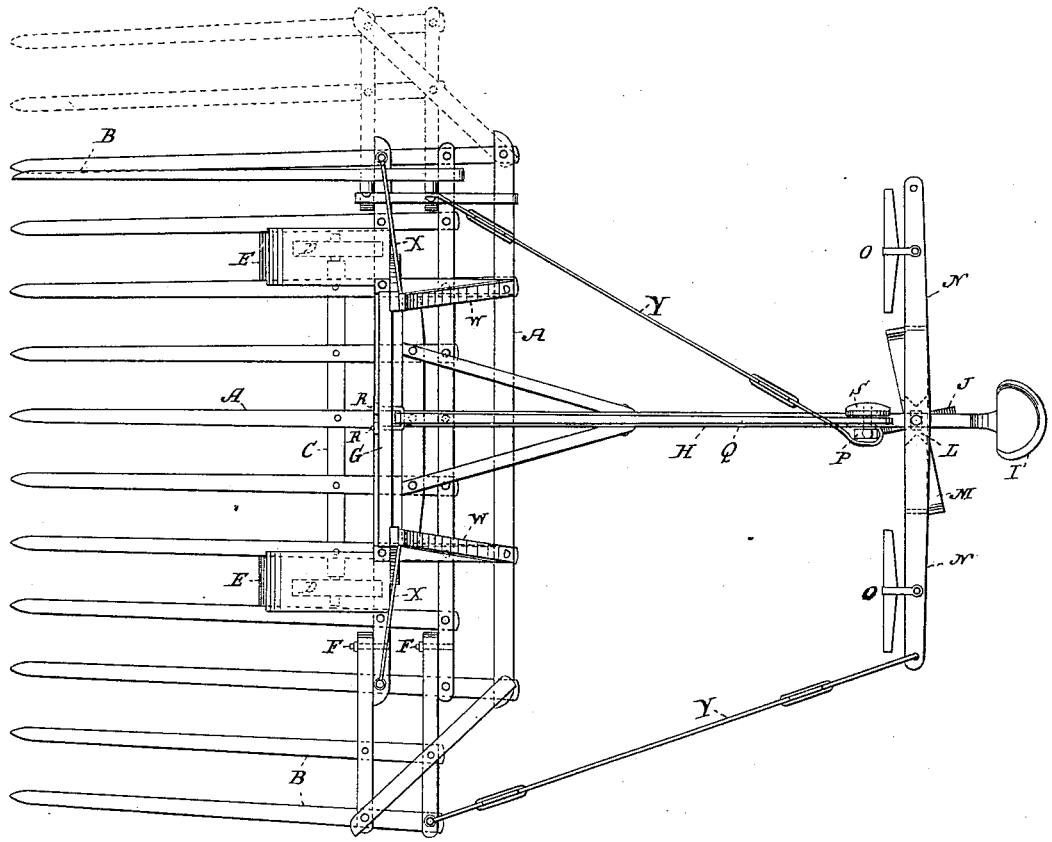

Referring to the accompanying drawings, Figure 1 is a side elevation of a horse hay-rake embodying the elements of the invention. Fig. 2 is a top view of same, one of the side frames of the rake being turned upward, its position when lowered on the same plane with the other parts of the rake being illustrated by dotted lines.

In the drawings, A denotes the main frame of the rake, having at each end the hinged sections B, and composed of suitable bars connected at their rear ends to form a rigid frame. The rake A is mounted upon a transverse axle, C, having upon its ends the supporting-wheels D, which are protected above by the shields E, whereby hay coming upon the rake is prevented from reaching the wheels. The end sections, B, are hinged at F, so as to turn upward to the position illustrated in Fig. 1, when desired, in order to narrow the rake when passing over a road, or when it is desired to pass through a gate. Upon the rear portion of the rake A is secured the transverse frame G, between the lower portions of the sides of which is pivotally secured the front end of the tongue H, which has upon its rear end the seat I, and is supported by the wheel J, mounted on an axle between the sides of the standard K, the upper portion of which is contracted and fits within the rectangular aperture L, formed in the guiding foot-bar M, the upper extremity of the said standard K being inserted through an aperture in the tongue H, and through the center of the cross-bar N, supporting the single-trees O.

The purpose of the bar M is to afford a means whereby the driver, sitting upon the seat I, may guide the wheel J by pressing upon one or the other end of the said bar, according to the direction in which it is desired the rake to move.

Upon one side of the tongue H, forward of the wheel J, is pivotally secured the lower end of the hand-lever P, to which is pivoted one end of the connecting-rod Q, the other end of same being attached to the upper part of the frame G by the bolts R, as indicated in Figs. 1 and 2. Upon the side of the tongue H opposite to that upon which the lever P is secured is rigidly affixed the plate S, containing a series of apertures, T, in either of which the pin V may be placed, according to the position of the lever P.

The purpose of the lever P and rod Q is to either elevate or depress the points of the teeth of the rake, according as the said lever is drawn rearward or pressed forward and there secured by the pin V. The central frame, G, is strengthened by brace-rods W, of suitable character, and by rods X.

The hinged sections B have secured at their outer rear edges the front ends of the jointed rods Y, the rear ends of which may be attached to the cross-bar N, as indicated in the drawings, or be hooked upon the lever P, according as the said frames B are in a horizontal position, or have been turned upward vertically to the position shown in Fig. 1.

The operation of the apparatus described is almost apparent from its construction. The frames B are turned upward, when desired, by drawing on the jointed rods Y, and the points of the teeth of the rake may be elevated or depressed at the will of the driver by means of the lever P and connecting-rod Q. The horses by which the rake is moved will be hitched to the single-trees O, being behind the rake-bars, pushing the same forward, and the movement of the rake to the right or left will be controlled by the wheel J and bar M.

What I claim as my invention, and desire to secure by Letters Patent, is—

1. In a horse hay-rake, the combination, with the frame A, of the hinged sections B, pivotally secured to the frame and adapted to be vertically raised, in the manner and for the purpose set forth, a tongue secured to the frame, the wheel J, and rods Y, adapted to hold the sections B in their raised or lowered positions, substantially as set forth.

2. In a horse hay-rake, the combination, with the frame A and vertically-moving sections B, pivotally secured thereto, of the vertical frame G, secured to the frame A, the vertically-movable tongue H, lever P, secured to the tongue, the rod Q, connecting said frame G and tongue H, and rods Y, all of the above parts being combined and adapted to operate substantially as set forth.

Signed at Chillicothe, in the county of Livingston and State of Missouri, this 6th day of January, A. D. 1885.

GEORGE ROBINSON.

Witnesses:
J. P. THOMAS,
G. H. MARLEY.